US008005875B2

(12) United States Patent  (10) Patent No.: US 8,005,875 B2
Hickey et al.  (45) Date of Patent: *Aug. 23, 2011

(54) AUTOMATIC DATA TRANSMISSION IN RESPONSE TO CONTENT OF ELECTRONIC FORMS SATISFYING CRITERIA

(75) Inventors: Matthew W. Hickey, Portland, OR (US); James H. Wolfston, West Linn, OR (US); Susan E. Malveau, Lake Oswego, OR (US)

(73) Assignee: CollegeNet, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/264,042

(22) Filed: Nov. 3, 2008

(65) Prior Publication Data

US 2009/0271208 A1  Oct. 29, 2009

Related U.S. Application Data

(63) Continuation of application No. 11/157,180, filed on Jun. 20, 2005, now abandoned, which is a continuation of application No. 09/999,064, filed on Oct. 31, 2001, now Pat. No. 6,910,045.

(60) Provisional application No. 60/245,778, filed on Nov. 1, 2000.

(51) Int. Cl.
    *G06F 7/00*  (2006.01)
(52) U.S. Cl. ......................... 707/804; 707/942; 707/947
(58) Field of Classification Search .................. 707/732, 707/751, 768, 804, 942, 947; 705/10, 26, 705/321; 709/218
    See application file for complete search history.

(56) References Cited

U.S. PATENT DOCUMENTS

| 4,817,050 | A | 3/1989 | Komatsu et al. |
|---|---|---|---|
| 5,655,085 | A | 8/1997 | Ryan et al. |
| 5,706,434 | A | 1/1998 | Kremen et al. |
| 5,721,686 | A | 2/1998 | Shahraray et al. |
| 5,737,737 | A | 4/1998 | Hikida et al. |
| 5,740,549 | A | 4/1998 | Reilly et al. |
| 5,754,845 | A | 5/1998 | White |
| 5,771,379 | A | 6/1998 | Gore, Jr. |

(Continued)

FOREIGN PATENT DOCUMENTS

WO  9963454  12/1999

(Continued)

OTHER PUBLICATIONS

FlipDog.com; 2009; FlipDog; retrieved on Mar. 9, 2009 [www.flipdog.com].

(Continued)

*Primary Examiner* — Thuy N Pardo
(74) *Attorney, Agent, or Firm* — Scheinberg & Griner, LLP; Michael O. Scheinberg; David Griner (57) ABSTRACT

Automatic transmission of information is generated when the content of a posted electronic form matches a predefined criteria. An interface allows the user to create a criterion template to specify the match criterion without requiring the user to have the skills of a professional programmer. The person to be notified and the form and content of the notification can also be defined by the user and can be dependent on the content of the posted form. In one application, individuals associated with an institution of higher learning are automatically notified when a student submits an electronic profile form showing that the student meets a pre-specified criteria.

1 Claim, 6 Drawing Sheets

U.S. PATENT DOCUMENTS

| | | |
|---|---|---|
| 5,784,608 A | 7/1998 | Meske, Jr. et al. |
| 5,819,280 A | 10/1998 | Nagai |
| 5,826,265 A | 10/1998 | Van Huben et al. |
| 5,832,497 A | 11/1998 | Taylor |
| 5,835,911 A | 11/1998 | Nakagawa et al. |
| 5,845,283 A | 12/1998 | Williams et al. |
| 5,848,397 A | 12/1998 | Marsh et al. |
| 5,862,223 A | 1/1999 | Walker et al. |
| 5,862,325 A | 1/1999 | Reed et al. |
| 5,864,853 A | 1/1999 | Kimura et al. |
| 5,864,864 A | 1/1999 | Lerner |
| 5,873,085 A | 2/1999 | Enoki et al. |
| 5,873,087 A | 2/1999 | Brosda et al. |
| 5,878,418 A | 3/1999 | Polcyn et al. |
| 5,879,163 A | 3/1999 | Brown et al. |
| 5,884,314 A | 3/1999 | Bulusu |
| 5,893,091 A | 4/1999 | Hunt et al. |
| 5,893,109 A | 4/1999 | DeRose et al. |
| 5,905,862 A | 5/1999 | Hoekstra |
| 5,913,212 A | 6/1999 | Sutcliffe et al. |
| 5,915,243 A | 6/1999 | Smolen |
| 5,924,089 A | 7/1999 | Mocek et al. |
| 5,924,094 A | 7/1999 | Sutter |
| 5,930,802 A | 7/1999 | Lee |
| 5,933,830 A | 8/1999 | Williams |
| 5,933,836 A | 8/1999 | Gobat |
| 5,940,843 A | 8/1999 | Zucknovich et al. |
| 5,950,201 A | 9/1999 | Van Huben et al. |
| 5,950,203 A | 9/1999 | Stakuis et al. |
| 5,951,300 A | 9/1999 | Brown |
| 5,960,421 A | 9/1999 | Cline et al. |
| 5,974,406 A | 10/1999 | Bisdikian et al. |
| 5,974,446 A | 10/1999 | Sonnenreich et al. |
| 5,978,648 A | 11/1999 | George et al. |
| 5,978,768 A * | 11/1999 | McGovern et al. ........... 705/321 |
| 5,978,836 A | 11/1999 | Ouchi |
| 5,999,934 A | 12/1999 | Cohen et al. |
| 5,999,937 A | 12/1999 | Ellard |
| 5,999,939 A | 12/1999 | De Hilster et al. |
| 6,002,915 A | 12/1999 | Shimizu |
| 6,005,597 A | 12/1999 | Barrett et al. |
| 6,052,122 A | 4/2000 | Sutcliffe et al. |
| 6,065,014 A | 5/2000 | Wakio et al. |
| 6,070,177 A | 5/2000 | Kao et al. |
| 6,073,138 A | 6/2000 | De L'Etraz et al. |
| 6,075,968 A | 6/2000 | Morris et al. |
| 6,078,928 A | 6/2000 | Schnase et al. |
| 6,081,807 A | 6/2000 | Story et al. |
| 6,088,717 A | 7/2000 | Reed et al. |
| 6,092,074 A | 7/2000 | Rodkin et al. |
| 6,094,654 A | 7/2000 | Van Huben et al. |
| 6,098,069 A | 8/2000 | Yamaguchi |
| 6,108,690 A | 8/2000 | Sakamoto |
| 6,112,209 A | 8/2000 | Gusack |
| 6,115,710 A | 9/2000 | White |
| 6,115,711 A | 9/2000 | White |
| 6,128,624 A | 10/2000 | Papierniak et al. |
| 6,141,662 A | 10/2000 | Jeyachandran |
| 6,148,302 A | 11/2000 | Beylin et al. |
| 6,157,924 A | 12/2000 | Austin |
| 6,161,104 A | 12/2000 | Stakutis et al. |
| 6,173,284 B1 | 1/2001 | Brown |
| 6,173,285 B1 | 1/2001 | Nishita et al. |
| 6,175,831 B1 | 1/2001 | Weinreich et al. |
| 6,182,067 B1 | 1/2001 | Presnell et al. |
| 6,185,573 B1 | 2/2001 | Angelucci et al. |
| 6,195,662 B1 | 2/2001 | Ellis et al. |
| 6,199,079 B1 | 3/2001 | Gupta et al. |
| 6,202,068 B1 | 3/2001 | Kraay et al. |
| 6,212,262 B1 | 4/2001 | Kamel |
| 6,212,520 B1 | 4/2001 | Maruyama et al. |
| 6,216,122 B1 | 4/2001 | Elson |
| 6,216,124 B1 | 4/2001 | Wakio et al. |
| 6,216,130 B1 | 4/2001 | Hougaard et al. |
| 6,216,135 B1 | 4/2001 | Brodersen et al. |
| 6,216,175 B1 | 4/2001 | Sliger et al. |
| 6,219,669 B1 | 4/2001 | Haff et al. |
| 6,223,173 B1 | 4/2001 | Wakio et al. |
| 6,226,649 B1 | 5/2001 | Bodamer et al. |
| 6,236,984 B1 | 5/2001 | Owens et al. |
| 6,256,623 B1 | 7/2001 | Jones |
| 6,260,059 B1 | 7/2001 | Ueno et al. |
| 6,263,330 B1 | 7/2001 | Bessette |
| 6,263,340 B1 | 7/2001 | Green |
| 6,272,467 B1 | 8/2001 | Durand et al. |
| 6,272,485 B1 | 8/2001 | Sragner |
| 6,282,548 B1 | 8/2001 | Burner et al. |
| 6,282,549 B1 | 8/2001 | Hoffert et al. |
| 6,289,337 B1 | 9/2001 | Davies et al. |
| 6,327,574 B1 | 12/2001 | Kramer et al. |
| 6,345,278 B1 | 2/2002 | Hitchcock et al. |
| 6,370,510 B1 * | 4/2002 | McGovern et al. ........... 705/321 |
| 6,374,237 B1 | 4/2002 | Reese |
| 6,385,594 B1 | 5/2002 | Lebda et al. |
| 6,385,620 B1 * | 5/2002 | Kurzius et al. ................ 707/804 |
| 6,398,556 B1 | 6/2002 | Ho et al. |
| 6,427,063 B1 | 7/2002 | Cook et al. |
| 6,460,042 B1 | 10/2002 | Hitchcock et al. |
| 6,480,885 B1 | 11/2002 | Olivier |
| 6,527,556 B1 | 3/2003 | Koskinen |
| 6,567,784 B2 | 5/2003 | Bukow |
| 6,591,263 B1 | 7/2003 | Becker et al. |
| 6,631,363 B1 | 10/2003 | Brown et al. |
| 6,647,410 B1 | 11/2003 | Scimone et al. |
| 6,681,223 B1 | 1/2004 | Sundaresan |
| 6,685,478 B2 | 2/2004 | Ho et al. |
| 6,691,153 B1 | 2/2004 | Hanson et al. |
| 6,718,340 B1 | 4/2004 | Hartman et al. |
| 6,735,568 B1 | 5/2004 | Buckwalter et al. |
| 6,751,596 B1 | 6/2004 | Hastings |
| 6,757,682 B1 | 6/2004 | Naimark et al. |
| 6,824,639 B1 | 11/2004 | Hill et al. |
| 6,859,784 B1 * | 2/2005 | van Duyne et al. ............. 705/10 |
| 6,883,014 B1 | 4/2005 | McErlean |
| 6,901,383 B1 | 5/2005 | Ricketts et al. |
| 6,910,045 B2 | 6/2005 | Hickey et al. |
| 6,985,879 B2 | 1/2006 | Walker et al. |
| 7,003,546 B1 | 2/2006 | Cheah et al. |
| 7,010,532 B1 | 3/2006 | Stakutis et al. |
| 7,010,533 B1 | 3/2006 | Kutsumi et al. |
| 7,139,732 B1 | 11/2006 | Desenberg |
| 7,143,060 B2 | 11/2006 | Foster et al. |
| 7,149,964 B1 | 12/2006 | Cottrille et al. |
| 7,162,471 B1 | 1/2007 | Knight et al. |
| 7,165,038 B1 | 1/2007 | Singh et al. |
| 7,167,855 B1 | 1/2007 | Koenig |
| 7,277,911 B2 | 10/2007 | Cheah |
| 7,315,861 B2 | 1/2008 | Seibel et al. |
| 7,325,028 B1 | 1/2008 | Smith et al. |
| 7,630,986 B1 * | 12/2009 | Herz et al. ....................... 707/10 |
| 7,743,100 B2 | 6/2010 | Cheah |
| 2001/0009017 A1 | 7/2001 | Biliris et al. |
| 2001/0014145 A1 | 8/2001 | Kamel et al. |
| 2002/0002552 A1 | 1/2002 | Schultz et al. |
| 2002/0026452 A1 | 2/2002 | Baumgarten et al. |
| 2002/0032632 A1 | 3/2002 | Sernet |
| 2002/0046074 A1 | 4/2002 | Barton |
| 2002/0055870 A1 | 5/2002 | Thomas |
| 2002/0072946 A1 | 6/2002 | Richardson |
| 2002/0087520 A1 | 7/2002 | Meyers |
| 2002/0120532 A1 * | 8/2002 | McGovern et al. ............. 705/26 |
| 2002/0128894 A1 * | 9/2002 | Farenden ........................ 705/8 |
| 2002/0194179 A1 | 12/2002 | Siefert |
| 2003/0105826 A1 | 6/2003 | Mayraz |
| 2004/0221011 A1 | 11/2004 | Smith et al. |
| 2005/0187866 A1 | 8/2005 | Lee |
| 2006/0069746 A1 * | 3/2006 | Davis et al. .................... 709/218 |
| 2006/0129477 A1 | 6/2006 | Goodwin et al. |
| 2008/0022220 A1 | 1/2008 | Cheah |
| 2009/0049049 A1 | 2/2009 | Cheah |
| 2009/0049059 A1 | 2/2009 | Cheah |
| 2009/0049149 A1 | 2/2009 | Cheah |
| 2009/0055730 A1 | 2/2009 | Cheah |
| 2009/0055747 A1 | 2/2009 | Cheah |
| 2009/0063512 A1 | 3/2009 | Cheah |
| 2009/0083235 A1 * | 3/2009 | Joao ............................... 707/942 |

| | | | |
|---|---|---|---|
| 2009/0089292 | A1 | 4/2009 | Cheah |
| 2009/0254971 | A1* | 10/2009 | Herz et al. ............... 726/1 |
| 2010/0257248 | A1 | 10/2010 | Cheah |

FOREIGN PATENT DOCUMENTS

| | | |
|---|---|---|
| WO | 0055751 | 9/2000 |

OTHER PUBLICATIONS

Gundavaram, S., "CGI Programming in the World Wide Web," Mar. 1996, 418 pgs., O'reilly & Associates, Inc., Sabastopol, CA.

Adams et al., M., "Center for Metalloenzyme Studies," The University of Georgia; CMS Faculity (www.uga.edu/cms/Faculity) and Summer Undergraduate Research Program (SURP) (www.uga.edu/cms/SURP) and Electronic Form Submittal Response, Mar. 1998, 9 pgs.

"About Us," http://corp.embark.com/company/, http://corp.embark.com/company/history.asp, Oct. 13, 2000, 3 pgs.

Davidson, Ben, Correspondence from Ben Davidson to Alan D. Albright, Aug. 17, 2009, 2 Pages.

Pearson, D., "Proposal," Charleston Trident Association of Realtors, Outfit Systems, Inc., Aug. 1999, 34 Pages.

Outfit Systems, Inc., Software Code for Innovia MLS System, Publication Date Unknown, 3 Pages.

Outfit Systems, Inc., "Attachment to Contract: Addendum to Contract," Aug. 1999, 1 Page.

Web, Bailey, "Remtec 2000," Lexis Nexis, News Net, Jun. 2000, pp. 1-6, ISSN: 0027-9994.

Realty Plus Online, Inc., "Fusion MLS 3.0: User Manual," Copyright 2000, 92 Pages.

Wolfston, J., "Method and Apparatus for Matching Individuals and Institutions," U.S. Appl. No. 09/479,271 (Abandoned), Jan. 1, 2000, 27 Pages.

Geac Intereality, "Net.MLS Application Specification: X.D: Flash: X.D.01: Overview," Oct. 12, 1998, 2 pages.

Geac Intereality, "Net.MLS Training Workbook," 2000, 92 pages.

Geac Intereality, "Net.MLS Advanced Internet MLS System: MLS Passport Innovative 'Mission Critical' Software," 2000, 6 pages.

Geac Intereality, "A Proposal to Provide On-Line MLS Service-Prepared for the Mississippi Gulf Coast Multiple Listing Service, Inc.," Oct. 19, 1999, 30 pages.

Pack, Thomas et al, "A Harbinger of Chance, The Cutting Edge", Library at the Los Alamos National Laboratory, 1999, 7pgs.

Pinacor, Inc., "Pinacor Unveils Electronic Message Center to Provide Resellers Customized, Profile Driven Communications Via E-mail," PR Newswire, Aug. 6, 1998, Tempe, Ariz. (2 pgs).

BackWeb Technologies, "BackWeb Forms Strategic Alliances with Individual, Desktop Data to Deliver Integrated Content to Enterprise Desktops", Business Wire, Dec. 10, 1997, San Jose, Cal., (4pgs).

Blake, Toni, "The virtual resident: Computerizing Lead Management", Journal of Property Management, Jan. 1, 1999 (4 pgs).

Gale Group Inc., "What are You Willing to Pay for Unsaleables?", ISSN 0745-4503; vol. 72, Jun. 7, 1999, (2 pgs).

M2 Communications, Ltd., "VERITY: Verity Introduces new Profiler Kit and enhanced Developer's Kit", M2 Presswire, Aug. 5, 1998 (4 pgs).

Sovereign Hill Software, Inc., "Sovereign Hill Software Introduces InFilter 2.0", PR Newswire, May 19, 1997, Dedham, Mass., (3 pgs).

Hilpern, Kate, "Net gain for Graduate Job-seekers", The Independent Newspaper- London, Jan. 25, 2001, (4 pgs).

"HomeGain.com, the Internet's First Resource Exclusively for Home Sellers, Launches on the Web Today", PR Newswire, Apr. 26, 1999, Emeryville, Cal., ( 5pgs).

"Thaumaturgix Teams with Rx Remedy to Develop Interactive Web Site that Delivers Personalized Health News and Information", PR Newswire, Sep. 29, 1998, New York, NY, (3 pgs).

Bayer, B, "A role for batch systems in the world of online searching", A Role for Batch Systems in the World of Online Searching- book, 1984, (1pg).

Curle, David, "Filtered News Services", Online; Mar./Apr. 98, vol. 22, Issue 2, p.14, 9p 1 chart (12 pgs).

Feldman, Susan, "Intelligent Agents: A Primer", Article- Searcher; Oct. 99, vol. 7 Issue 9, p42, 14p, 1 chart, 4 color, (21pgs).

Goff, Leslie, "Matchmaking on the Web", Article- Computerworld; Apr. 17, 2000, vol. 34 Issue 16, p55, 1p, 1 color, (3 pgs).

Webb, William, "Interactive classified ad service launched", Article-Editor & Publisher; Oct. 28, 1995, vol. 128 Issue 43, p38, 1p, (3pgs).

Personal Library Software Inc., "PLS unveils 'smart' personal agent software", Online; Mar./Apr. 96, vol. 20 Issue 2, p10, (1 pg).

Radosevich et al., Netscape Communications Corp., "Breaking up is easy to do", Article- InfoWorld; Jul. 1997, vol. 19 Issue 27, p1, 2p, 1 chart (3pgs).

Rose, Sarah, "Where to Ref* Online You can definitely save time—and perhaps lots of money—by shopping for a refi online. Each of these six sites works a bit differently, so it pays to explore them all", Money Magazine, Dec. 1, 1998, vol. 27 No. 12, (4 pgs).

Rhodes et al., "Just-in-time information retrieval agents", 2000, International Business Machines Systems Journal, (20 pgs).

Wang, Angelena, "Global Recruiting", Morgan & Banks Co., Sep. 1999, (2 pgs).

Klopper et al., "Unearthing Market Research: Get Ready for a Bumpy Ride", Article- Searcher; Mar. 2000, vol. 8 Issue 3, p.42, 6p (8pgs).

Lyle, Don, "Meet the Players", ISSN; 0744-5881, 2000 Bell & Howell Information and Learning Company, May 1, 2000, (34 pgs).

McCleary, Hunter, "Filtered Information Services", Article- Online; Jul. 1994, vol. 18 Issue 4, p.33, 1 chart, 5bw, (11pgs).

Nance-Mitchell, Veronica, "FinAid and fastweb-two for the money!", Article- Online; Jan./Feb. 1998, vol. 22 Issue 1, p. 72, 2p, 3 bw, (3 pgs).

Nelms, Willie, "Personalizing Service in a Growing Library", Bristol Public Library in Virginia Tennessee, (1 pg) 1978.

* cited by examiner

AUTOMATIC DATA TRANSMISSION IN RESPONSE TO CONTENT OF ELECTRONIC FORMS SATISFYING CRITERIA

This application is a continuation of and claims priority over U.S. patent application Ser. No. 11/157,180 filed on Jun. 20, 2005, now abandoned which is a continuation of U.S. patent application Ser. No. 09/999,064 filed on Oct. 31, 2001 and patented as U.S. Pat. No. 6,910,045 issued Jun. 21, 2005, which was the non-provisional of U.S. Patent Application No. 60/245,778, filed Nov. 1, 2000, all of which are incorporated herein by reference.

TECHNICAL FIELD OF THE INVENTION

The present invention relates to the field of electronic forms processing, and in particular, to providing automatic transmission of electronic information to any party or parties when the content of a submitted form meets pre-specified criteria and, more particularly, to the use of automatic notification of college recruiters when information in a submitted student profile meets a pre-specified criteria.

BACKGROUND AND SUMMARY OF THE INVENTION

Electronic forms are widely used to transfer information over computer networks. Typically, a computer user operating a Web Browser such as Netscape Navigator or Internet Explorer views a Web Site and selects a link that results in the downloading of a form to the users computer. The form may be a static form or may be dynamically generated in response to user information. A mechanism for creating and processing such forms is described in U.S. patent Ser. No. 09/325,533 for a "Universal Forms Engine," which is assigned to the assignee of the present invention.

When a form is posted, the submitted information is typically stored in a database. Authorized database users desiring to access the information can query the database using a database query language or, preferably, use a graphical user interface provided by a database programmer. If the database is continually being updated, an authorized database user will not necessarily know when information of interest has been received on an electronic form and will therefore have to query the database periodically. Alternatively, a skilled computer programmer can write a program that automatically responds to the submission of a form. Such programs are commonly used, for example, to acknowledge the receipt of purchase orders submitted as electronic forms over the Internet.

The Standout® system from CollegeNET, Inc., the assignee of the present invention, is an example of a system in which forms are submitted electronically, information from the forms is stored in a database, and then the database is queried by authorized users. In the Standout® system prospective college applicants can create customized student profiles that are searchable by recruiters or other college personnel. The Standout® system is described in co-pending U.S. patent application Ser. No. 09/479,271, which is hereby incorporated by reference. In the Standout® system, a prospective applicant completes and submits over a computer network an electronic form that includes multiple fields of information. The information in the form is stored in corresponding fields of a database. An authorized user, such as a college recruiter, searches the database to identify prospective applicants having desired characteristics. Thus, the Standout® system provides a system by which institutions can search through a pool of prospective applicants to locate qualified individuals and by which prospective applicants can present themselves to the institutions. The Standout® database is continually updated by the students. The information is therefore current, and the student profiles are immediately available on line to recruiters as the profiles are created and updated.

Although the Standout® system is a help to college recruiters and applicants, a recruiter is required to manually search the Standout® database to locate potential recruits. The recruiter can miss potential recruits that complete or edit profiles after the recruiter performs a search, so the recruiter must search frequently, even though most of the repetitive searches may not produce results.

It is an object of the invention to provide for the automatic transmission of information to one or more people or computer systems when the content of a submitted electronic form meets a criterion;

It is another object of the invention to provide a user with an interface for generating a criteria template that defines a match criterion to be used to trigger the transmission of information when the match criterion is satisfied by the content of a submitted electronic form;

It is a further object of the invention to provide for such automatic transmission of information to a recipient whose identity is determined from the content of the electronic form;

It is yet another object of the invention to provide for such automatic transmission of information having form and content determined from the content of the form;

It is yet a further object of the invention to provide such an interface that allows a user without the skills of a professional computer programmer to generate the criteria template;

It is still a further object of the invention to provide for automatically generating e-mail notification when data in an electronic form submitted over a computer network meets a specified criterion;

It is still another object of the invention to provide a method of determining from a large amount of potentially relevant electronic information being continually submitted over a computer network through electronic forms by multiple users, information of interest to an individual and automatically bringing that information to the attention of the individual; and It is still a further object of the invention to provide rapid notification to a recruiter when a potential recruit submits a profile matching the criteria specified by the recruiter.

In the present invention, first computer users complete electronic forms and submit them over a computer network such as the Internet. The forms include fields through which the users provide values for parameters corresponding to the fields. The set of values for all parameters specified in the form is referred to as the form value set. Second computer users use criteria template generation interfaces to generate criterion templates. Each criterion template defines a match criterion comprising a criterion value set, that is, a value or set of values corresponding to one or more of the parameters in the forms. The criterion template generation interface provides the second users with the ability to generate criterion templates without the assistance of a professional computer programmer.

When a form is posted by one of the first users, the form value set or a subset thereof is automatically compared to the match criterion specified by one or more of the criterion templates previously defined by one or more of the second users. If the form value set satisfies the match criterion, information is automatically transmitted to one or more people or computers. The information to be transmitted can be preset or can be determined from the form value set. For example, the transmitted information can include part or all of the electronic form content or can be a simple notification stating that a form having a parameter or parameters of specified values has been posted. The person or persons to whom the information is transmitted can also be preset or can be determined from the value set of the form.

The form and content of the information to be transmitted, as well as the recipients of the transmitted information, can be specified by the second users using the criterion template generation interface. Alternatively, the second users can use a notification specification generation interface to separately create a notification specification that defines explicitly or by rule the content and form of the information to be transferred and one or more recipients. The notification specification is then mapped to or associated with one or more criterion templates by the second user so that when the submitted form satisfies the match criteria of the associated criteria templates, information as specified in the notification specification is transmitted to the recipients specified in the notification specification.

The criterion template generation interface, in combination in some embodiments with the notification specification generation interface, allows a user to create a criteria template and to define the form, content, and recipients of the information to be transmitted without the assistance of a skilled computer programmer.

Receipt of a single electronic form can trigger the generation of multiple data transmissions in response to satisfying a single match criterion. It is also possible for a single electronic form to satisfy more than one criteria template and thereby trigger multiple transmissions of information. The information could be transferred to people or to computer systems.

When the invention is used with the Standout® system, it eliminates the requirement that the college recruiter repeatedly and manually conduct searches of the database and that the financial aid administrator manually inspect submitted applications prior to acting on them.

The foregoing has outlined rather broadly the features and technical advantages of the present invention in order that the detailed description of the invention that follows may be better understood. Additional features and advantages of the invention described hereinafter form the subject of the claims of the invention. It should be appreciated by those skilled in the art that the conception and specific embodiment disclosed may be readily utilized as a basis for modifying or designing other methods and structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and the advantages thereof, reference is now made to the following descriptions taken in conjunction with the accompanying drawings, in which.

DETAILED DESCRIPTION OF THE PREFERRED EMBODIMENT

The present invention provides for the automatic electronic transmission of information, typically by electronic mail, in response to the content of electronic forms meeting a pre-specified criterion.

Figure 1:
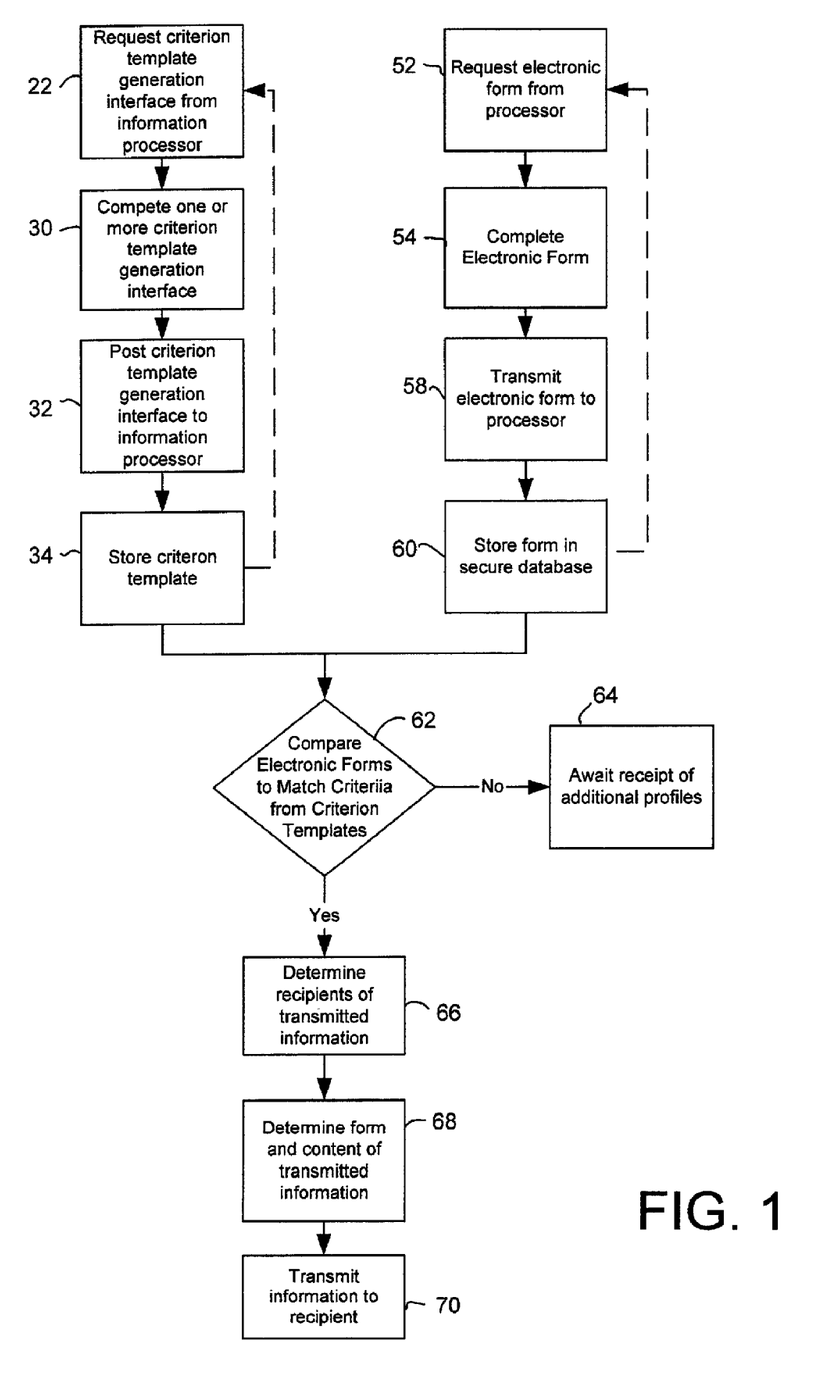
FIG. 1 is a flow chart of a preferred embodiment of the present invention.
Figure 2:
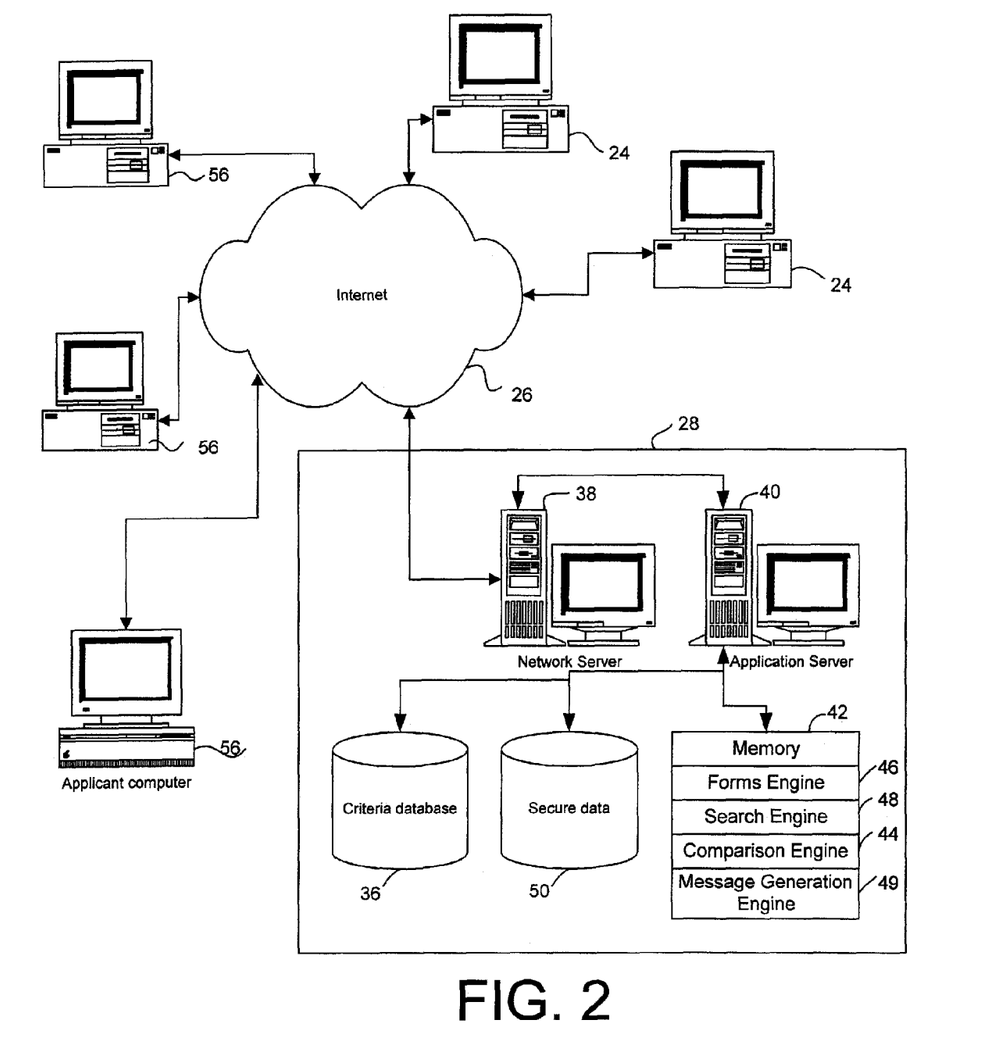
FIG. 2 is a block diagram showing the hardware used to implement the process of FIG. 1

FIG. 1 is a flow chart showing the steps of a preferred embodiment of the present invention. FIG. 2 shows some of the hardware and software used in those steps. In step 22, a first individual uses a first computer 24, such as an IBM compatible or a Macintosh personal computer, to request over a computer network 26, such as the Internet, a criterion template generation interface from an information processor 28 that preferably services multiple first individuals. The first individuals use the criterion template generation interfaces for creating new criterion templates or for editing a previously created criterion templates. In step 30, the first individual completes one or more criterion template generation interfaces to define a criterion template, which specifies a match criterion, that is, a set of parameter values that, when matched by the value set of a submitted electronic form, will initiate the automatic transfer of information, such as the automatic transmission of an electronic notification. The criterion template can include sub-parts, with different sub-parts causing the automatic transmission of information to the same or different recipients, contingent upon the same or different parameters values in the value set of the electronic form.

The first individuals may also use the criterion template generation interface to define, either explicitly or by a rule, one or more recipients of transmitted electronic information, as well as the form and content of the transmitted information. Alternatively, the recipient and the form and content of the information to be transmitted can be specified separately from the match criterion in a notification specification, and then one or more notification specifications can be associated with or mapped to the criterion templates. The completed criterion template generation interface is posted in step 32 to information processor 28 to create the criteria template. In step 34, the criterion template specifying the match criterion is stored in criteria database 36.

At information processor 28 is a network server 38, such as a Sun Solaris UltraSparc Server, executing communications software, such as Apache HTTPD Server from The Apache Group, Forest Hill, Md., www.apache.org, to communicate over computer network 26. Also at processor 28 is an applications server 40, preferably operating behind a firewall, in data communications with network server 38 and having a memory 42 that contains software used in the present invention, including a comparison engine 44, a forms engine 46, such as the Universal Forms Engine described in U.S. patent application Ser. No. 09/325,533, for generating and processing forms, a search engine 48, and a message generation engine 49. Criteria database 36, which contains information from the criterion template, and a secure database 50, which contains personal information submitted on forms, are in data communications with applications server 40. The software operating on the applications server 40 and network server 38 communicate with each other and with necessary databases using standard protocols, such as CGI or Apache API. Skilled persons will understand that additional servers may be used.

Multiple first individuals will typically complete multiple template criterion generation interfaces in step 22 and post them to processor 28 to create criterion templates and store them in criteria database 36. This is shown in FIG. 1 by the dashed line returning from step 34 to step 22. The first individuals could be part of a single enterprise and connected to processor 28, for example, over a local area network, a wide area network, or an intranet. Alternatively, processor 28 could service many unrelated first individuals, each having potential interest in the content of forms being submitted to processor 28 and connected to processor 28 through a publicly accessible network such as the Internet. For example, an employment service can make electronically submitted employee profiles available to multiple subscribing employers.

In step 52, a second person using a second computer 56 requests an electronic form over a computer network, which may be the same as computer network 26, from processor 28. In step 54, the second person completes or edits the electronic form and in step 58 transmits it over computer network 26 to processor 28. The values for parameters entered into the fields of the form, cumulatively referred to as the value set for the form, is stored in step 60 in secure database 50. Typically, many such second persons are continually completing or editing electronic forms and posting them over computer network 26, as shown by the dashed line from step 60 back to step 52.

In step 62, comparison engine 44 compares the value set of the posted form with the match criteria specified in the criterion templates stored in criteria database 36. If the form value set does not satisfy any of the match criteria, the system awaits in step 64 receipt of another electronic form. Because second persons are continually creating and editing electronic forms, comparison engine 44 has a stream of form value sets to compare to the stored criterion template. Comparing the form value set with the match criteria does not require that the value of every parameter of the form value set be checked; the match criteria will typically specify required values for fewer than all the parameters.

If the content of any submitted form satisfies any of the stored criterion templates, in step 66 message generation engine 49 determines the recipient or recipients of the information to be transmitted. The recipient may be the individual who completed the criterion template generate interface or someone else. Multiple transmissions may be sent. Although the method of determining the recipient of the information is pre-specified, the actual recipient of the notification may depend upon the content of the form and may not, therefore, be known before the form value set is analyzed.

In step 68, message generation engine 49 determines the form and content of the information to be transmitted. The information may be transmitted to the recipient, for example, by e-mail or a file can be downloaded to the recipient's computer using another protocol, such as file transport protocol (FTP). The transmitted information may include a copy of the entire form that matched the criteria. The transmitted information may include text that is determined by or includes content from the form that satisfied the criteria. After the recipients and the form and content of the notification is determined, automatic transmission of information is then initiated in step 70.

Figure 3:
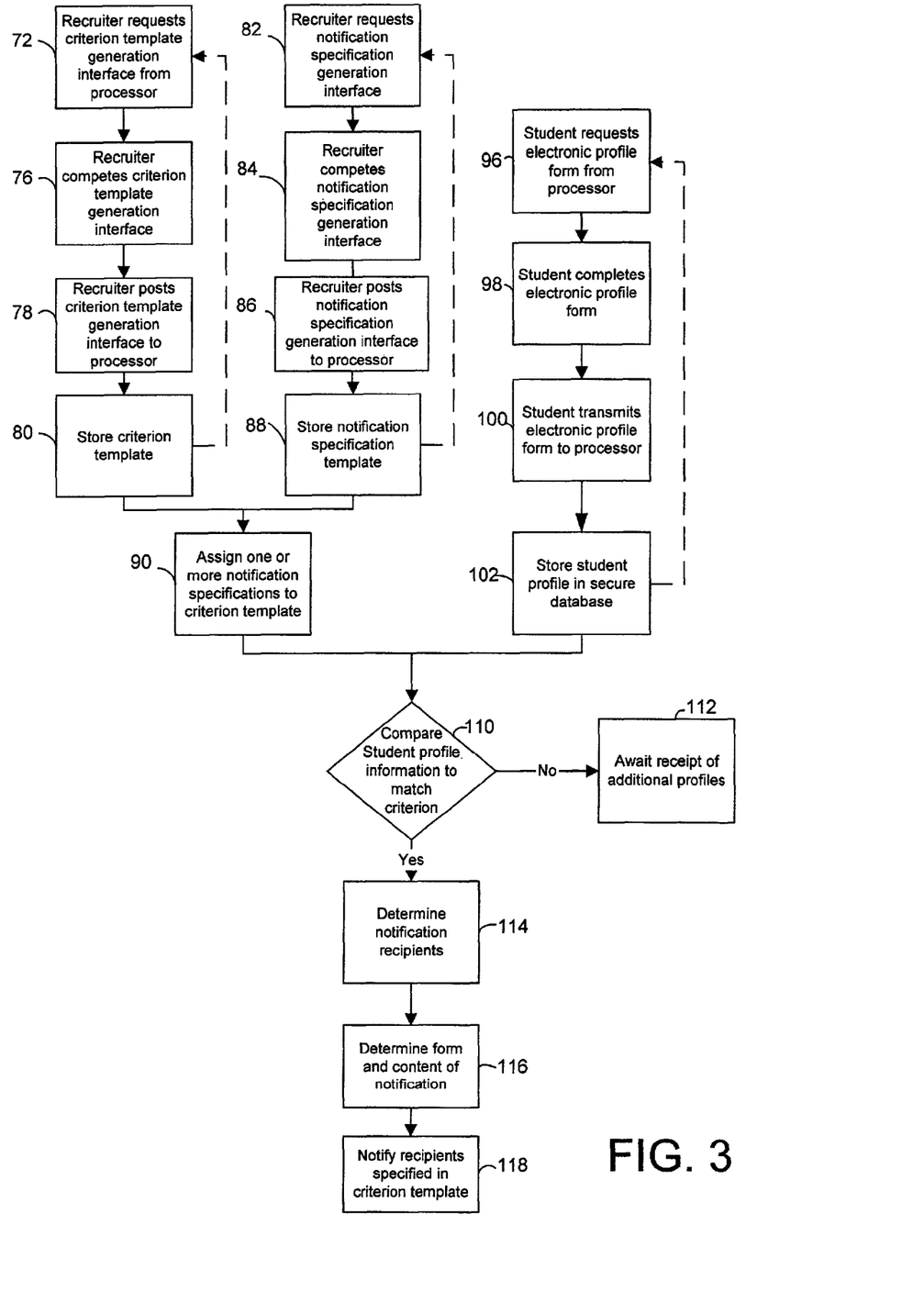
FIG. 3 is a flow chart showing another preferred embodiment of the present invention.
Figure 4:
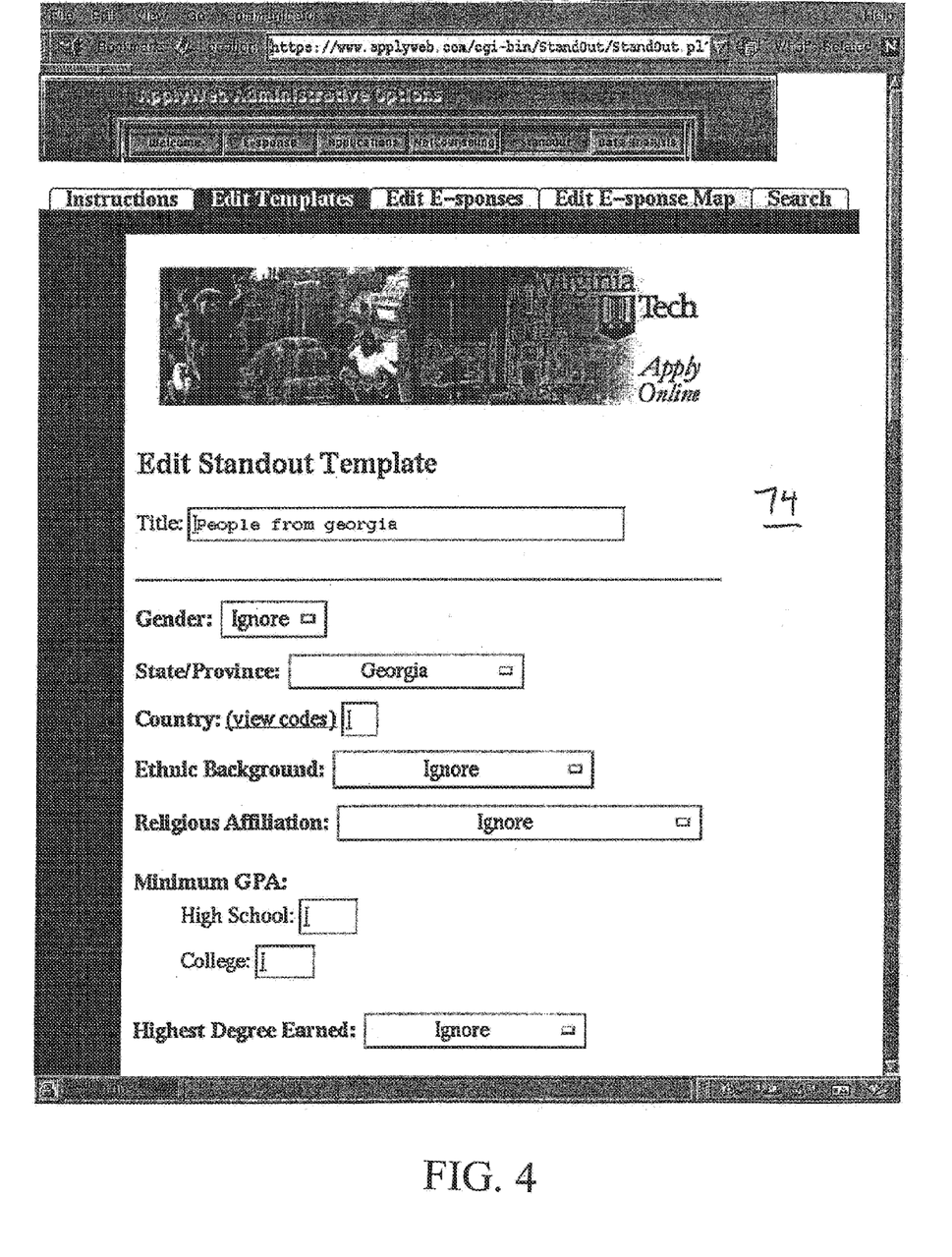
FIG. 4 shows a template used by a recruiter to specify criteria in accordance with invention.

The flowchart of FIG. 3 shows an embodiment in which college or university recruiters are notified when a prospective applicant submits a profile indicating that he or she has characteristics sought by the recruiter. The hardware used in the embodiment of FIG. 3 is the same as that shown in FIG. 1. This embodiment is preferably used in conjunction with the Standout® recruiting system. In step 72, a recruiter or other individual uses a first computer 24 to request a criterion template generation interface form from processor 28. FIG. 4 shows a typical criterion template generation interface 74 used to create a criterion template that defines a match criteria that will trigger the automatic transmission of information.

In step 76, the recruiter or other college official completes the criterion template generation interface 74 and specifies a match criterion that defines characteristics of a student for which the school has a recruiting need. FIG. 4 shows that the recruiter in this example has defined a criteria template entitled "People from Georgia" and has specified for the match criterion any students from the state of Georgia. Other fields of criterion template generation interface 74, corresponding to parameters such as "Ethnic Background," "Religious Affiliation," and "Minimum GPA," were not completed by the recruiter and so the value of those fields in the student profile will not disqualify a student from meeting the match criteria. There is typically a field in the criterion template generation interface corresponding to each field in the student profile, so any information in the student profile can be used for matching.

In step 78, the criterion template generation interface is posted to information processor 28, which creates a criterion template. In step 80, the criterion template is stored in criteria database 36. A recruiter will typically complete multiple criterion template generation interfaces, to create criterion templates to meet the requirements of a school for students in many areas.

In step 82, the recruiter requests from processor 28 a notification specification generating interface to define a notification specification that describes, either explicitly or by rules, the form and content of each notification and the notification recipients. The recruiter can use one or more the notification specification generating interface to specify multiple recipients, with customized notification content for each. For example, one of the recipients may be the recruiter who created the criterion template and another may be the student who submitted the triggering form. In step 84, the recruiter completes one or more notification specification generating interfaces.

Figure 5:
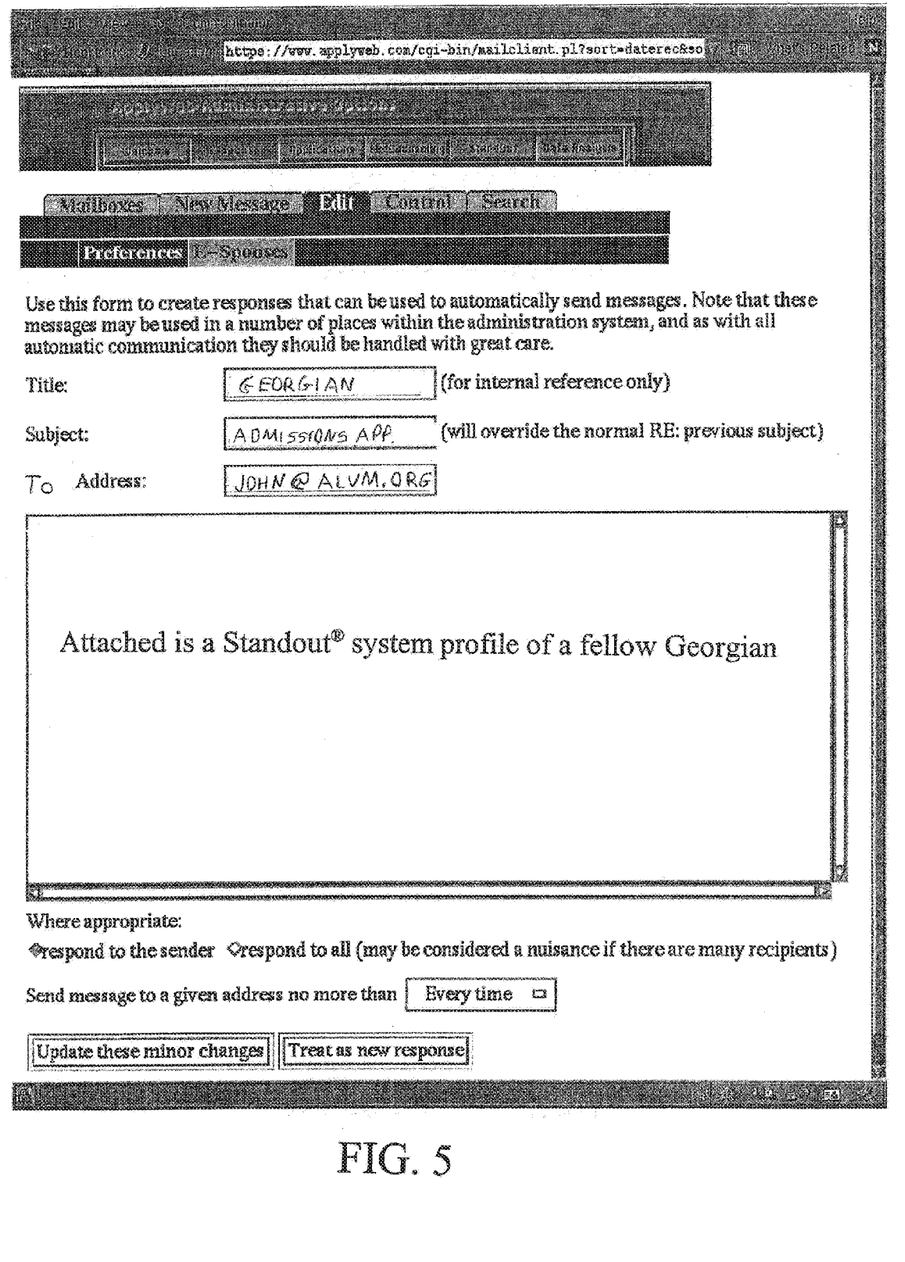
FIG. 5 is a computer screen used to define a response when an electronic form meets the criteria specified in the criterion template of FIG. 4.

FIG. 5 shows a notification specification generating interface being used by the recruiter to define a notification specification entitled "Georgian." FIG. 5 shows that an e-mail will be sent to John at Alum.org when the "Georgian" response is triggered, and the message will state: "Attached is a Standout® system profile of a fellow Georgian." In step 86, the notification specification generating interface is posted to processor 28, and in step 88, the notification specification is stored.

Figure 6:
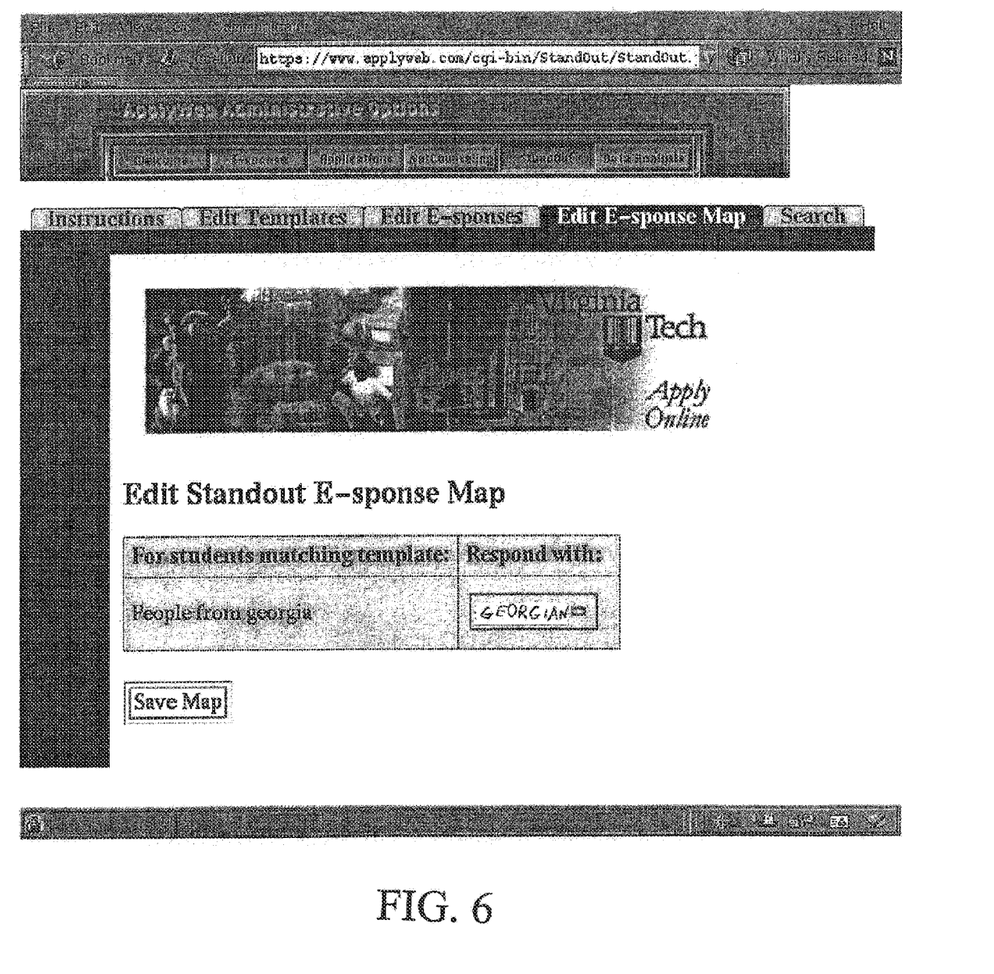
FIG. 6 is a computer screen used to associate the response definition of FIG. 4 with the criteria definition of FIG. 5.

After criterion templates and notification specifications are created, one or more notification specifications are mapped to or associated with the criterion templates in step 90, thereby defining the information transfer that is triggered when the match criteria is met. FIG. 6 shows a screen in which the recruiter assigns to the notification criteria entitled "People from Georgia" the response entitled "Georgian."

In step 96, a student uses a second computer 56 to request over computer network 26, preferably the Internet, an electronic profile form from processor 28. In step 98, the student uses the form to create a new student profile or edit an existing profile, and in step 100, the profile is posted to processor 28. In step 102, information from the student profile in stored in secure database 50.

Students are continually creating or editing profiles on second computers 56 and posting the profiles through the Internet 26 to processor 28. In step 110, the newly created or edited profile is compared with the match criteria from all criterion templates stored in criteria database 36. If the student profile does not satisfy any of the stored criteria templates, the system waits in step 112 for additional students profiles to be submitted. When a new criterion template is created and assigned a notification specification in step 90, a search is optionally conducted of the student profiles in the Standout® database, and existing information about students that have profiles satisfying the match criteria are transmitted in accordance with the notification specification associated with the matching criteria template.

For each submitted form that satisfies a stored criterion template, one or more transmissions of information to recipients is triggered. In step 114, the system determines the recipients from the notification specifications assigned to the criterion template. The recipients may include a recruiter, another person explicitly specified in the notification specification, or a person determined in accordance with instructions specified in the notification specification and dependent upon the content of the profile. For example, a recipient may be an alumni director of the student's home state if the student profile indicates that one of the students parents graduated from the school. The recipient could also be the student that submitted the profile, that is, a message could also automatically be sent back to the student.

In step 116, the software determines the form and content of the notification. The notification can include information from the student profile. For example, the notification to a recruiter may read: "Student John Smith meets your criteria for a student that plays the saxophone and has a B or better average grade." A message sent back to the submitting student may read: "Dear John, we are excited to receive your application because our band needs experienced saxophone players . . . . " In step 118, the notification is transmitted to the recipients.

A single submitted student profile could satisfy multiple match criteria for a single institution. Moreover, satisfying a single match criterion could result in multiple notifications being sent in response to the receipt of a single form, if one of the notification specifications includes multiple recipients or if more than one notification specification is mapped to the criteria template. For example, a student's form could indicate that the student's parents are alumni of the institution, that the student is an accomplished athlete in a sport of interest to the institution, and that the student is interested in financial aid, resulting in e-mails to the alumni office, the sports director, and the financial aid office.

Information processor 28 could be within the recruiter's college, that is, the system can be implemented as a stand alone service of a single institution. Preferably, however, the invention is implemented as part of an overall system in which a third party processor 28 makes student profiles available to multiple institutions and provides additional services to students and institutions, such as applications processing. An example of a system serving multiple institutions is the ApplyWeb® system from CollegeNET, Inc., the assignee of this application. Information on various forms, such as student profiles and admissions applications, processed by processor 28 are preferably shared among forms used in the various services provided by the third party administrator, so that information entered once by the student, unless specified otherwise, is automatically available and inserted into forms in other services.

Although the embodiment of the invention described above is implemented in a university environment, the invention is applicable in many different settings. For example, the invention could be used by a charitable organization. When a donation or other correspondence is received, notification could be provided to different personnel within the charity, depending upon the size of donation or the characteristics of the donor. In another application, an individual seeking to purchase a home could complete a form specifying desired characteristics of the home, and real estate sale persons could define templates to identify potential buyers seeking certain types of properties, such as waterfront homes or homes with acreage. When a form from a potential purchaser satisfies a criteria template created by the salesperson, the potential purchaser, the salesperson, or both could be automatically notified.

In yet another implementation, a dating service could allow each member of the service to complete a personal profile, describing himself or herself, and a criteria template, describing the person being sought. When a two-way match occurs, that is, when a first user's personal profile satisfies a second user's criteria and the second user's personal profile also satisfies the first user's criteria, both the first and second users are notified. A one-way match between a personal profile and a criteria, that is, when a first user meets a second user's criteria, but the match is not mutual, no notification is initiated. In practice, the questions for each user to create his personal profile and his criteria template could be merged into a single set of queries.

Although the singular "criterion" is used above in connection with "match criterion" and "criterion template," it should be understood that such labels do not exclude the use of multiple criteria for matching. Also, the term "notification specification" used to specify the form, content, and recipients of an information transmission is not limited to information whose content is a "notification," but can specify the transmission of any information, including, for example, an acknowledgment back to the individual who completed the form that triggered the transmission.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method of assisting college recruiters to identify students meeting criteria specified by the college, comprising:
    providing on a ongoing basis to multiple students forms for creating personal profiles over a computer network;
    creating personal profiles, each personal profile associated with one of the multiple students;
    providing to recruiters from multiple institutions a template to specify a student criterion;

automatically comparing personal profiles with the student criterion to find personal profiles that meet the criterion; and as personal profiles are submitted, automatically generating an electronic notification to one or more individuals at the college notifying the one or more individuals of the student whose profile meets the criterion or responding to the student who meets the profile.

* * * * *